No. 742,587. PATENTED OCT. 27, 1903.
H. B. CARLTON.
REEL.
APPLICATION FILED JUNE 9, 1903.
NO MODEL.
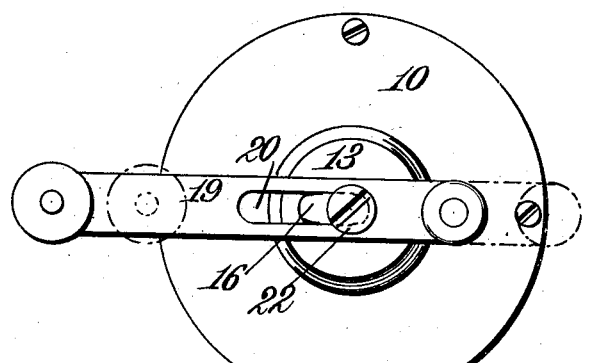
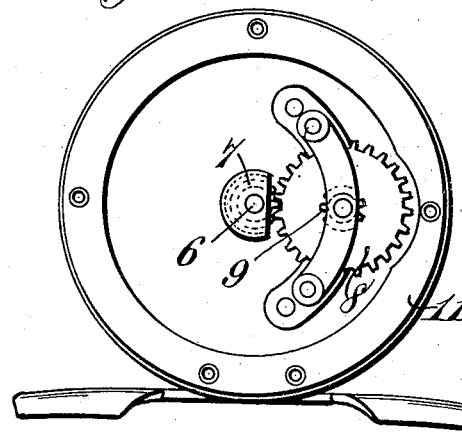
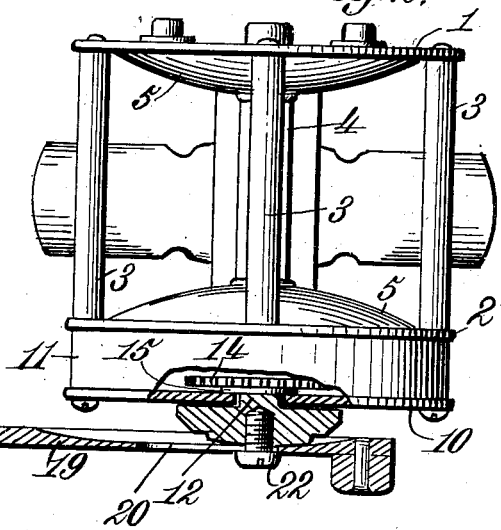
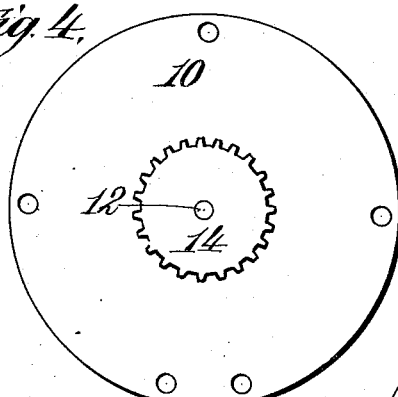
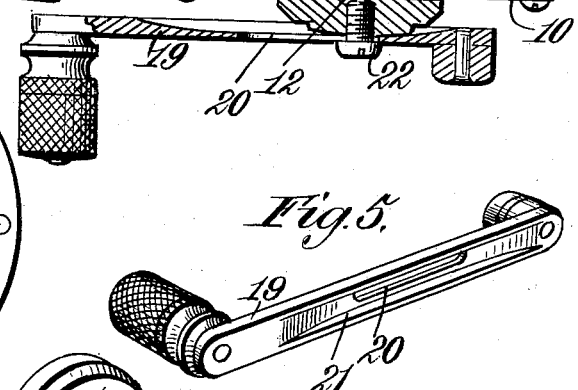
Witnesses
Inventor:
Harvey B. Carlton,
By James L. Norris
Atty.

No. 742,587.

Patented October 27, 1903.

UNITED STATES PATENT OFFICE.

HARVEY B. CARLTON, OF ROCHESTER, NEW YORK, ASSIGNOR TO CARLTON MANUFACTURING CO., OF ROCHESTER, NEW YORK, A CORPORATION OF NEW YORK.

REEL.

SPECIFICATION forming part of Letters Patent No. 742,587, dated October 27, 1903.

Application filed June 9, 1903. Serial No. 160,676. (No model.)

*To all whom it may concern:*

Be it known that I, HARVEY B. CARLTON, a citizen of the United States, residing at Rochester, in the county of Monroe and State of New York, have invented new and useful Improvements in Reels, of which the following is a specification.

This invention relates to a fishing-reel, and has for its object to provide an extensible reel crank or handle whereby to increase the leverage in turning the winding-spool. Heretofore it has been customary to manufacture reels adapted to yield to three or four revolutions of the spool to one of the handle. Ordinarily reels are not manufactured to yield more than four revolutions of the spool to one of the handle by reason of the fact that the power necessary to wind in the line, especially if a fish should be on the hook, is so great as to tire the operator. If the handle should be made longer to increase the leverage, it would be in the way and cumbersome to manipulate when not drawing in the fish. According to the ratio of rotation of the spool relative to the handle, reels are denoted as "two-multiple," "three-multiple," "four-multiple," &c.

It is the purpose of my invention to enable a reel of a much higher multiple to be employed and to provide for increasing the leverage of the handle in a simple manner, so that the added resistance produced by the high gearing may be compensated for.

The reel illustrated in the drawings is intended to be a nine-multiple reel—that is to say, the spool will be revolved nine times to one revolution of the handle.

In order that the invention may be clearly understood, I have illustrated the same in the accompanying drawings, in which—

Figure 1 is a side elevation of the reel, the normal position of the handle being shown in dotted lines and the extended position thereof in full lines. Fig. 2 is a part sectional plan view of the same. Fig. 3 is a view similar to Fig. 1, the front plate and parts attached thereto being removed to disclose the operating-gears. Fig. 4 is an interior view of the front plate. Fig. 5 is a detail view of the reel crank or handle, and Fig. 6 is a detail view of the journal-boss.

Referring now to the drawings, the reel comprises circular plates 1 2, attached in the usual manner to the ends of posts 3 to constitute the frame of the reel. The winding-spool comprises a spindle 4, having at each end semicircular cup-shaped disks 5. The winding-spool is provided with an axle 6, which is journaled at opposite ends in bearings in the plates 1 2, and on the outer side of the plate 2 is provided with a small spur-gear 7, which is in mesh with a large gear-wheel 8, suitably mounted in a rotatable manner on the outer side of the plate 2. Fixed to the gear-wheel 8 is a small spur-gear 9. The front plate 10 of the reel is supported from the plate 2 by means of an annular band or ring 11, of any suitable material, whereby to afford a housing for the gearing of the reel. The front plate 10 is centrally apertured to provide a bearing for a journal 12, formed on the inner side of a boss 13, and on the inner end of the journal 12 is secured a large gear-wheel 14, which is adapted to mesh with the spur-gear 9. The gear-wheel 14, it is understood, is fixed to the journal of the boss 13 to rotate therewith and is separated from said journal by means of a washer 15.

The outer face of the boss 13 is provided with a lug 16, having parallel sides and provided with tapering end portions 17. A screw-threaded aperture 18 extends through the lug 16 into the boss.

19 indicates the reel crank or handle, which may be of the same length as or slightly longer than the ordinary handle, and is provided with a longitudinal slot or aperture 20 and on its under side with a channel or groove 21, the opposite ends of which gradually diminish in thickness. In applying the handle to the reel the channel 21 is inserted over the lug 16, which fits in said channel snugly, but so as to permit the handle to slide over said lug, and the handle is retained in position by means of a screw 22, inserted through the elongated aperture or slot 20 and screwed into the aperture 18.

In the normal position of the handle (shown by dotted lines in Fig. 1) the winding-spool may be readily revolved without the expenditure of very much more power than is required to wind the spool of, say, a four-multiple reel. If, however, some resistance be offered to the winding of the line, as in the case of a fish being on the hook, it is desirable to increase the leverage of the handle in order to enable the spool to be rotated with comparative ease. This is effected by exerting a slight longitudinal pull on the handle, which will cause it to slide outward over the lug 16, and this movement continues until the diminishing depth of the channel 21 causes the handle to bind between the head of the screw 22 and the tapering end 17 of the lug 16. This extended position of the handle is shown in Fig. 1 and in the sectional part of Fig. 2. In order to prevent the handle from binding too tightly, and thus interfere with its ready movement in the opposite direction to shorten the leverage, the slot 20 is so located in the handle and is of such length that its outer end will come in contact with the screw 22 at the time that the binding of the handle is sufficient to temporarily hold it in an adjusted position.

When the reel is not in use for winding, it is desirable that the handle should not project beyond the side of the reel, as it is more apt to be caught in some object and be bent or broken, and thus when the winding of the line has been completed the handle is pushed inward to the position shown in dotted lines in Fig. 1, and the same binding operation will occur between the opposite end of the lug 16 and of the channel 21 as that previously described. In turning the handle power is applied to the reel through the gear 14, spur-gear 9, gear 8, and spur-gear 7 in the ordinary manner.

It will be seen that I provide an exceedingly simple arrangement for increasing the leverage of the handle, there being no parts to become disarranged and it only being necessary to exert a slight pull or push, as the case may be, upon the handle to vary its position on the reel.

Having thus fully described my invention, what I claim as new, and desire to secure by Letters Patent of the United States, is—

1. In a reel, in combination with a boss rotatively mounted thereon and operatively connected with the gearing, a handle slidably mounted on and frictionally engaging with said boss, whereby said handle may be clamped in adjusted positions thereon.

2. In a reel, in combination with a boss rotatively mounted thereon and operatively connected with the gearing, a handle slidably mounted on and frictionally engaging with said boss, whereby said handle will be clamped in engagement with said boss at the limit of its movement in either direction.

3. In a reel, in combination with a boss rotatably mounted thereon and operatively connected with the gearing, a lug on said boss, a handle slidably mounted on said boss and provided with a channel for receiving said lug, and means whereby the handle will be clamped in position at the limit of its movement in either direction.

4. In a reel, in combination with a boss rotatably mounted thereon and operatively connected with the gearing, a lug on said boss provided with a screw-threaded aperture, a handle slidably mounted on said boss and provided with a channel or groove, diminishing in depth at each end, and with a longitudinal slot, and a screw inserted through said slot and engaged in said aperture, the combination operating as described.

5. In a reel, in combination with a boss rotatably mounted thereon and operatively connected with the gearing, a lug on said boss having tapering ends, a handle slidably mounted on said boss and provided with a channel for receiving said lug and with a longitudinal slot, said channel gradually diminishing in depth at each end, and said lug having tapering ends to coöperate with the corresponding ends of the channel, and a screw passed through said slot and engaging in said boss.

In testimony whereof I have hereunto set my hand in presence of two subscribing witnesses.

H. B. CARLTON.

Witnesses:
ELWOOD L. SMITH,
ETTA N. SIMMELINK.